United States Patent [19]

Rea et al.

[11] Patent Number: 4,582,605
[45] Date of Patent: Apr. 15, 1986

[54] IN-LINE PIPELINE STRAINER

[75] Inventors: David B. Rea; Alexander B. Mann, both of Erie; Ronald F. Hornyak, Lake City; Ronald A. McKean, Erie, all of Pa.

[73] Assignee: R-P & C Valve Inc., Fairview, Pa.

[21] Appl. No.: 607,435

[22] Filed: May 7, 1984

[51] Int. Cl.[4] ............................................. B01D 35/02
[52] U.S. Cl. ..................................... 210/447; 210/450; 210/498
[58] Field of Search ................. 210/447, 450, 453, 498

[56] References Cited

U.S. PATENT DOCUMENTS

| | | | |
|---|---|---|---|
| 1,961,498 | 6/1934 | Krueger | 210/447 |
| 2,465,404 | 3/1949 | Sonntag | 210/447 |
| 3,179,253 | 4/1969 | McNeil | 210/447 |
| 3,556,298 | 1/1971 | Hueber | 210/447 |
| 3,648,843 | 3/1972 | Pearson | 210/447 |

FOREIGN PATENT DOCUMENTS 826310 12/1959 United Kingdom .
958148 5/1964 United Kingdom .
1119730 7/1968 United Kingdom ................ 210/447

Primary Examiner—John Adee
Attorney, Agent, or Firm—Wayne L. Lovercheck; Charles L. Lovercheck; Dale R. Lovercheck

[57] ABSTRACT

A large diameter pipeline strainer has a body with a central chamber and an axially aligned inlet and outlet a lateral opening covered by a removable cover plate to allow removal and replacement of a strainer element mounted in the chamber. The strainer has first and second perforated conical sheet metal walls with an outer wall tapering from the inlet toward the outlet and an inner wall tapering from the outlet back to an apex at the inlet. The strainer is positioned by an annular bead at the inlet sealing against the body at the inlet and fitted within an annular groove formed in both the body and the cover. The strainer is supported at the outlet by a number of radially extending projections which engage the strainer at the point where the inner and outer walls are joined together.

10 Claims, 5 Drawing Figures

FIG. I

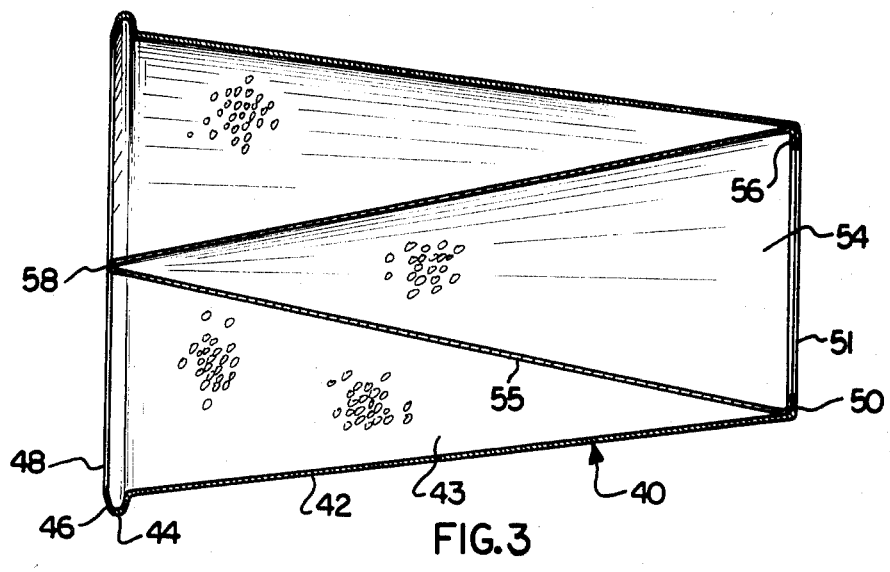
FIG. 3
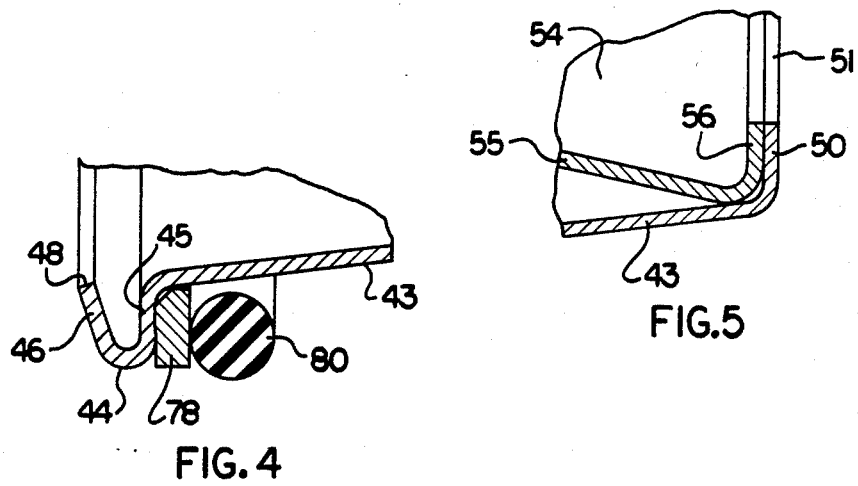
FIG. 4
FIG. 5

IN-LINE PIPELINE STRAINER

BACKGROUND OF THE INVENTION

This invention relates generally to pipeline strainers, and more particularly to strainers for medium and large diameter pipes which have a strainer or screen member which is removable for cleaning purposes.

Many industrial processes and equipment utilize pipeline systems for circulating water, steam, or other fluids for various purposes, and such systems may include various sensitive components such as regulators, steam traps, meters, pumps and other equipment that can easily be damaged by contaminants such as scale and other solid particles which can enter the system from a variety of sources. While many such systems do not require the complete freedom from contamination that is provided by special filtration equipment, it is usual to place strainer units at various places in the pipeline system for removing the larger size particles of contaminants. Such strainers may be used in various sized pipes from the smallest up to 36 inches or larger, and provide a housing in which is mounted a perforated screen element which may be formed either from woven mesh screen or from perforated sheet metal having openings sufficiently small in size to trap damaging particles and sufficiently large in number to prevent any substantial pressure drop through the strainer.

One common type of strainer is the so-called Y-type which has a body having an in-line inlet and outlet for mounting in a straight section of pipe. The housing has a branching portion extending at an acute angle with the outlet and mounting a cylindrical screen which is held in place by an outlet plug or cover which may have a reduced diameter blow-off plug therein. These strainers are mounted in a pipeline so that the fluid entering the inlet is deflected through an acute angle down the lower or strainer leg of the Y into the cylindrical strainer basket. The fluid then passes radially outward through openings in the side of the cylinder forming the screen, leaving any contaminant particles therein for removal by cleaning either by opening the blow-off opening or removal of the end cover. After the fluid has passed through the strainer, it must flow back upwardly to leave through the outlet in line with the inlet. Such strainers are widely used because they are relatively low cost to manufacture and can often be at least partially cleaned by mere removal of the blow-off plug. However, such strainers provide relatively limited screen area and require changes in direction of flow and increased turbulence in the fluid so that they tend to produce a relatively high pressure drop, particularly at high rates of flow.

Another type of pipeline strainer is the so-called basket strainer, which again has an inlet in line with the outlet and a wall separating the inlet and outlet that extends at an angle with respect to the axis, as from the bottom of the inlet to the top of the outlet. In this wall is located an opening to receive a cylindrical basket having a bottom end formed of screen material as well as the side walls, and having an oblique top having a flange adapted to mate with the opening in the wall. In such strainers, the fluid entering the inlet moves downwardly into the basket through the opening in the transverse wall, and then moves radially outward to the outlet opening. In strainers of this type, the area of the basket can be substantially greater than in strainers of the Y-type, and there is less turbulence and restriction to flow because of the more direct flow path between the inlet and the outlet. Such strainers usually have a cover above the basket held in place by bolts, or a clamp, for quick removal, so that cleaning can be accomplished by removing the cover and pulling out the basket, which usually has an attached handle in the form of a bail engaging the cover at the top to hold the strainer basket in place in the opening in the transverse wall. While such strainers have the advantage of increased filter area, easy cleaning, and low pressure drop, they tend to be rather large and bulky in size and more expensive than the Y-type for equal straining capacity.

SUMMARY OF THE INVENTION

The present invention provides a pipeline strainer having a coaxial inlet and outlet in which a basket or screen member is positioned, also to be coaxial with the inlet and outlet, so that all flow, except for that through the openings in the screen itself, is parallel to the axis of the pipe to provide a minimum pressure drop through the strainer even at very high rates of flow.

The strainer is constructed with a housing providing coaxial inlets and outlets, with suitable means, such as standard flanges, for attachment in an axial piping arrangement, and the center of the housing is provided with a somewhat enlarged chamber which has one open side which is closed by a removable cover plate. The screen is formed from perforated sheet metal, and has an outer portion which is conical in shape extending from an open end having a diameter slightly larger than that of the pipe to taper toward the outlet end to a portion of intermediate diameter. The remainder of the screen consists of a re-entrant or reversed cone extending from the outlet back to a point adjacent the inlet. The reduced diameter portion is positioned in the outlet by a plurality of legs or projections against which the intermediate diameter portion seats. The open end of the screen is provided with a flange and gasket which seats against a surface on the body surrounding the inlet opening to the chamber. Immediately behind, or downstream of the seat, and spaced therefrom, is a rib formed partially in the body and partially on the cover which fits behind the flange on the screen to further positively position the screen or strainer member from downstream movement. Because of the length of the screen and the re-entrant portion, it may be provided with sufficient screen openings to provide an open area of at least four times the cross-sectional area of the pipe and the element can easily be changed by removing the cover and lifting the screen out of its position in the chamber, where it is held by both the rib and the projecting legs at the outlet.

This arrangement allows a straight-through fluid flow path through the screen between the inlet and outlet and yet allows the screen to be easily changed by mere removal of the cover plate. Furthermore, since the flow is in a straight line, the overall size of the strainer is kept to a minimum which, except for the cover plate, may be smaller than the overall dimensions of the pipe flanges at each end of the body.

BRIEF DESCRIPTION OF THE DRAWINGS

FIG. 3 is a cross-sectional view of the strainer basket;

FIG. 4 is an enlarged, fragmentary, cross-sectional view of the inlet end of the straner basket of FIG. 3 showing details of the flange and gasket; and FIG. 5 is an enlarged, fragmentary, cross-sectional view of the outlet end of the strainer basket.

DESCRIPTION OF THE PREFERRED EMBODIMENT

Figure 1:
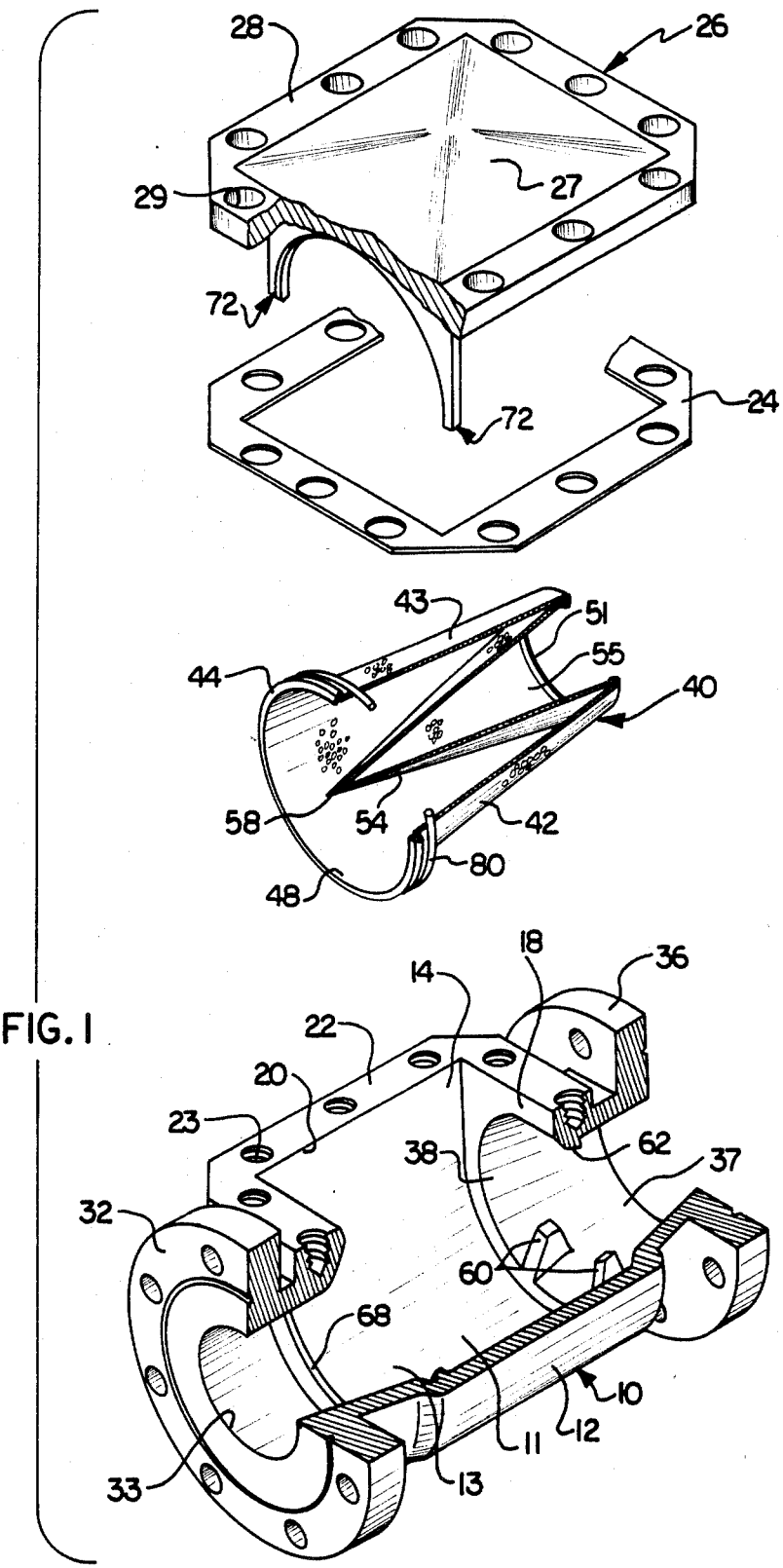
FIG. 1 is an exploded, perspective view of a pipeline strainer according to the preferred embodiment of this invention.
Figure 2:
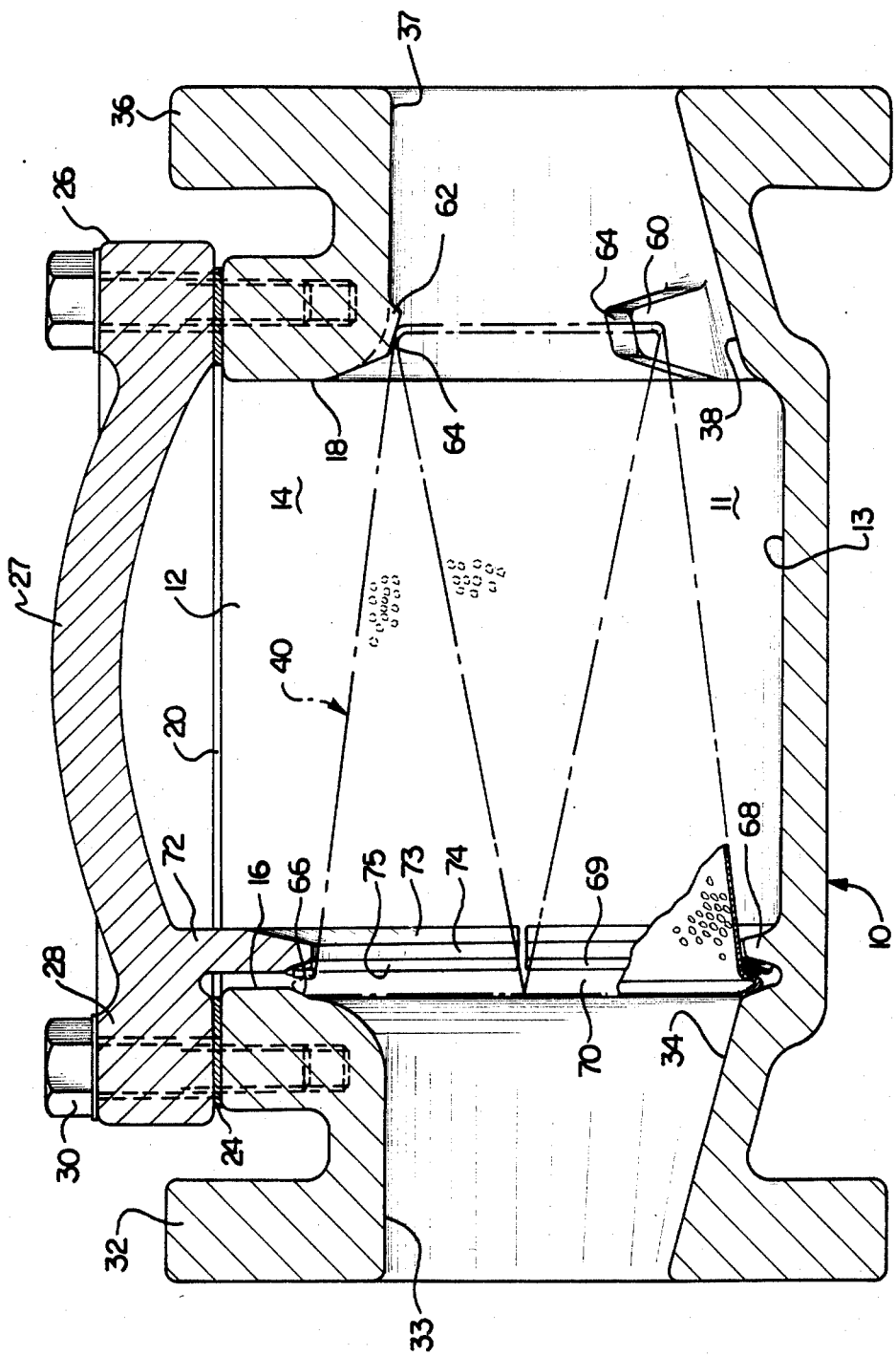
FIG. 2 is a cross-sectional, elevational view of the strainer of FIG. 1, with the screen member mostly in phantom line.

Referring to the drawings in greater detail, the strainer unit comprises a body 10 having a central chamber 11 defined by a U-shaped wall 12 having a semicircular bottom portion 13 and substantially parallel upper walls 14. The semicircular bottom wall 13 is generally cylindrical in shape and is spaced equidistantly from an axis defined by the inlet and outlet openings, as will be described in greater detail hereinafter.

The upper walls 14 extend generally upward from the sides of the bottom wall 13 in substantially parallel fashion. At the inlet end of chamber 11 is an inlet end wall 16 lying generally in a plane normal to the axis of the body and, likewise, an outlet end wall 18 is formed at the other end to be substantially parallel to the inlet end wall 16.

The two upper walls 14 and the two end walls 16 and 18 extend upward to define a top opening 20 which is substantially rectangular in shape and is surrounded by a planar surface 22 formed on the body 10. Suitable tapped holes, as indicated at 23, are formed in the surface 22 and a suitable sealing gasket 24 is shaped to make sealing contact with the surface 22 and be generally coextensive therewith. A cover 26 fits over the top opening 20 to enclose the chamber 11, and the cover 26 is provided with a generally domed center section 27 and an outer flange portion 28 which is arranged to make sealing contact against the gasket 24. The flange portion 28 is provided with clearance holes 29 to receive clamping bolts 30 which make threaded engagement with the capped holes 23 in the body 10 to hold the cover in place.

At the inlet end of the body 10 outward from the inlet end wall 16 is located an inlet flange 32 of a standard flange construction for attachment to a similar flange on the pipe to which the strainer is connected. The flange 32 has an axial bore 33 therein, and the lower portion 34 of the bore 33 is flared downwardly as it opens through the inlet end wall 16 into the chamber 11. Thus, bore 33 at the inlet flange 32 is of the same diameter as the pipe and increases in cross-sectional area toward the central chamber 11. Likewise, at the other end of the body 10 is located an outlet flange 36 similar to the inlet flange 32 and in axial alignment therewith. The outlet flange 36 has a bore 37 therein which is of the same diameter as the pipe adjacent the flange 36, and has a flared portion 38 increasing in area and flaring downwardly toward the U-shaped wall 12 as it meets the outlet end wall 18.

The strainer basket 40 is carried within the central chamber 11 to be coaxial with the inlet and outlet bores 33 and 37 to ensure a straight-through flow path between the inlet and outlet. The strainer basket 40 includes an outer member 42 formed of perforated, thin sheet metal, and has a conical wall 43 tapering inwardly from the inlet toward the outlet. Adjacent the inlet end, the outer member 42 has a radially extending bead or flange 44 having a radial wall 45 on the side away from the inlet and an annular inturned lip 46 on the outermost side adjacent the inlet to define an inlet opening 48 substantially larger than inlet bore 33 to receive all of the flow from the inlet bore 33.

Wall 43 tapers inwardly toward the outlet, where it is formed into an inturned lip 50 defining an outlet opening 51. The inner member 54, formed of the same material as the outer member 42, also has a conical wall 45 tapering from the outlet back toward the inlet, where it terminates in an apex 58. The wall 55 adjacent the outlet has an inturned annular lip 56 adapted to seat against the inner side of the inturned lip 50 of the outer member 42, and is secured thereto by suitable means such as spot welds so that the inner and outer members form a single unit.

The strainer basket 40 is positioned within the central chamber 11 by supporting and centering structures at both the inlet and outlet ends so that the strainer basket 40 is firmly positioned against radial or axial movement when the cover 26 is fastened in place. To support and position the strainer basket 40 at the outlet end, there are provided a pair of legs 60 projecting radially inward from the flared bore portion 38 and on the bore 37 above the legs 60 is located a radial projection 62, so that the projection 62 and the two legs 60 form a triangle. Legs 60 and the projection 62 are formed with seating surfaces 64 which are machined as surfaces of a cone whose axis lies on the central axis of the strainer basket and the inlet and outlet bores. The seating surfaces 64 engage the outer member 42 adjacent the inturned lip 50 and positively center and position the strainer basket against further movement toward the outlet. The legs 60 and projection 62 have a minimum cross-sectional area so that fluid flowing through the outer strainer member 41 can flow unobstructed to the outlet bore 37.

To seal and position the strainer basket 40 adjacent the inlet, an annular seat 66 is formed on the inlet end wall 16. The annular seat 66, which has a center about the longitudinal axis of the body, is generated as a sphere having a radius positioned axially in the plane passing through the plane of engagement of the strainer basket with the seating surfaces 64. Thus, with the strainer basket in place with the outlet end in engagement with the seating surfaces 64 at the outlet end, the strainer basket can be rotated about a lateral axis to bring the flaring lip 46 into tight sealing engagement with the seat 66, and because the strainer basket is made of a thin resilient sheet metal, the lip 46 can flex axially to accommodate dimensional tolerances while still maintaining tight sealing engagement against the seat 66.

To hold the strainer basket at the inlet end against axial movement, a semicircular rib 68 is formed in the body 10 projecting radially inward to a point adjacent the outer member wall 43 a spaced distance from the seat 66. The rib 68 extends substantially halfway around the central chamber 11 below the centerline and has a tapered side 69 adjacent the seat 66 defining an annular groove 70 therebetween.

While this rib 68 supports the lower end of the strainer, the upper end is supported by a wall portion 72 formed on the cover 26 to lie in the same plane as the rib 68 and having edges or projections 73 extending downwardly to define a rib 74 which is substantially coplanar with and an extension of the rib 68 formed on the body 10. The rib 74 has a tapered side 75 positioned with respect to a seat 66 in the same manner as the tapered side 69 of the lower rib 68.

When the strainer basket 40 is in place, the lip 46 will be in resilient engagement with the seat 66, and to provide a tight wedging action for holding the basket in place, a rigid annular backing ring 78 is placed behind the radial wall 45 and serves as a seat for an O-ring gasket 80, which in turn makes sealing engagement with the rib tapered sides 69 and 75.

Thus, it will be seen that to remove or replace the strainer basket 40, it is necessary only to remove the cover 26 and rotate the inlet end of the basket upward out of engagement with the rib 68, which is possible since the seat surface 66 is formed on the point of rotation adjacent the outlet seating surfaces 64. After the strainer basket has been cleaned, or if a new one is to be installed, it is only necessary to ensure that the backing ring 78 and O-ring 80 are in place, after which the basket is installed in the same manner, with the outlet end first making engagement with the seating surfaces 64 and the inlet end then being rotated downward so that the lip 46 is in engagement with the seat 66. The cover is then replaced, making sure that the wall portion 72 is in proper alignment to make engagement with the O-ring 80, after which the cover is clamped in place by the bolts 30.

The foregoing construction ensures a minimum of pressure drop through the strainer basket, since all flow is in a straight line between the inlet and the outlet, with the strainer basket 40 being formed as surfaces of rotation about the axis of the inlet and outlet openings. Thus, the only change in direction is the change necessary for the fluid to actually pass through the openings in the outer and inner members 42 and 54, and since these are formed on the surface of a cone, the deflection of the flow path is minimized. The perforations in the outer and inner members are arranged to give a very large flow area. For example, the walls may be made of stainless steel 0.019 in. thick, with circular perforations 0.033 in. in diameter so arranged that about 30% of the wall area is open and the area of the openings is then at least four times the cross-sectional area of the pipe. With this large opening area, adequate passage area is ensured even when the filter screen becomes partially clogged by contaminant particles, particularly since the flow of fluid ensures that the contaminant particles will tend to wash toward the outlet end of the strainer basket in the annular area between the outer and inner members so that a substantial amount of contaminants can fill this area before the effective opening area of the perforations is reduced to even twice the cross-sectional area of the pipe.

Although the preferred embodiment of this invention has been shown and described, it should be understood that various modifications and rearrangements of the parts may be resorted to without departing from the scope of the invention as disclosed and claimed herein.

What is claimed is:

1. A pipeline strainer comprising a body having a chamber, an inlet to said chamber, an outlet from said chamber, said inlet and said outlet being coaxial and defining a longitudinal axis, said body having a lateral opening at said chamber, a removable cover for sealing said lateral opening, said cover being substantially flat and lying on a plane parallel to said axis, a strainer of perforated sheet metal mounted in said chamber and removable through said lateral opening, said body having seating surfaces adjacent said outlet engageable with said strainer to position said strainer in said body at said outlet, said body having an annular seat extending around said inlet in a plane perpendicular to said axis and engageable with said strainer to position said strainer in said body at said inlet, said strainer having an annular bead and lip engaging said annular seat whereby said strainer is positively positioned at said inlet and said outlet when said cover is removed.

2. A pipeline strainer as set forth in claim 1, wherein said body includes a rib engaging said bead on the outlet side thereof to restrain said strainer against axial movement toward said outlet.

3. A pipeline strainer as set forth in claim 2, including a rib on said cover coplanar with said body rib, said body rib and said cover rib providing substantially continuous peripheral support for said bead.

4. A pipeline strainer comprising a body having a chamber, an inlet to said chamber, an outlet from said chamber,
   said inlet and said outlet being coaxial and defining a longitudinal axis,
   said chamber having walls spaced a greater distance from said axis than the radius of said inlet and said outlet,
   said body having a lateral opening at said chamber,
   a removable cover for sealing said lateral opening,
   a strainer of perforated sheet metal mounted in said chamber and removable through said opening,
   and positioning means on said body adjacent said inlet and said outlet for restraining said strainer against axial and radial movement at said inlet and said outlet,
   said positioning means at said inlet includes an annular sealing face engageable by said strainer,
   said positioning means at said inlet also includes an annular groove formed in said body and in said cover,
   and said strainer has an annular bead engageable in said annular groove.

5. A pipeline strainer as set forth in claim 4, wherein said positioning means at said outlet comprises inwardly projecting legs on said body.

6. A pipeline strainer as set forth in claim 4, wherein said strainer is formed with perforated walls lying on a surface of revolution about said longitudinal axis.

7. A pipeline strainer as set forth in claim 6, wherein said strainer has a first wall portion that is conical and tapers from said inlet to said outlet.

8. A pipeline strainer as set forth in claim 7, wherein said first wall portion at said outlet has a diameter less than the diameter of said outlet and a second wall portion tapers from said outlet back to an apex adjacent said inlet.

9. A pipeline strainer as set forth in claim 8, wherein said first wall portion at said inlet has a diameter greater than that of said inlet.

10. A pipeline strainer as set forth in claim 9, wherein the perforations in said first and second wall portions have an area of at least four times the area of said inlet.

* * * * *